United States Patent
Cazier et al.

(10) Patent No.: US 7,317,479 B2
(45) Date of Patent: Jan. 8, 2008

(54) AUTOMATED ZOOM CONTROL

(75) Inventors: Robert P. Cazier, Fort Collins, CO (US); Eric F. Aas, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/705,265

(22) Filed: Nov. 8, 2003

(65) Prior Publication Data

US 2005/0099514 A1 May 12, 2005

(51) Int. Cl.
*H04N 5/262* (2006.01)
*H04N 5/225* (2006.01)

(52) U.S. Cl. .............................. 348/240.99; 348/240.1; 348/220.1

(58) Field of Classification Search ........... 348/240.99, 348/240.3, 240.1, 333.01, 333.02, 220.1, 348/333.11, 157; 396/85; 715/723
See application file for complete search history.

(56) References Cited

U.S. PATENT DOCUMENTS

| | | | |
|---|---|---|---|
| 5,113,210 A | 5/1992 | Kashiyama et al. | |
| 5,172,234 A * | 12/1992 | Arita et al. | 348/240.2 |
| 5,227,824 A | 7/1993 | Yoshida et al. | |
| 5,231,437 A | 7/1993 | Kashiyama et al. | |
| 5,404,191 A | 4/1995 | Kashiyama et al. | |
| 5,473,403 A | 12/1995 | Suda et al. | |
| 5,486,893 A * | 1/1996 | Takagi | 396/147 |
| 6,750,903 B1 * | 6/2004 | Miyatake et al. | 348/218.1 |
| 6,906,751 B1 * | 6/2005 | Norita et al. | 348/349 |
| 2005/0219386 A1 * | 10/2005 | Stavely et al. | 348/240.3 |

FOREIGN PATENT DOCUMENTS

| | | |
|---|---|---|
| JP | 20000069345 | 3/2000 |
| JP | 2001042207 | 2/2001 |

* cited by examiner

*Primary Examiner*—Ngoc-Yen Vu
*Assistant Examiner*—Gregory V Madden

(57) ABSTRACT

Automated zoom control and/or automated wide angle capture for digital camera systems and related methods. The camera is configured to have imaging apparatus that selectively couples images from an image scene to an image sensing apparatus that senses the coupled images. A processor implements an automated zoom control function that automatically records a plurality of closely related images having different zoom levels sensed by the image apparatus, and from which a user selects images for storage.

20 Claims, 2 Drawing Sheets

---

50

51 — CONFIGURING A CAMERA TO HAVE A SHUTTER BUTTON, A LENS, AN IMAGE SENSOR FOR RECEIVING IMAGES VIEWED BY THE LENS, AND PROCESSING CIRCUITRY THAT COMPRISES A CONTROL ALGORITHM

52 — AUTOMATICALLY RECORDING A PLURALITY OF IMAGES UPON DEPRESSING OF THE SHUTTER BUTTON TO CAPTURE A SERIES OF VERY CLOSELY RELATED IMAGES HAVING DIFFERENT ZOOM LEVELS AND/OR WIDE ANGLE SETTINGS

53 — SELECTING AN IMAGE FROM THE SERIES OF AUTOMATICALLY RECORDED IMAGES FOR STORAGE

AUTOMATED ZOOM CONTROL

TECHNICAL FIELD

The present invention relates generally to digital camera systems and methods.

BACKGROUND

Conventional digital still cameras have zoom lenses and zoom control mechanisms. The main disadvantages of currently available digital still cameras is that these systems force the photographer to perform all of the tasks that he or she has always done using conventional non-digital cameras to prepare to take a photograph. It would be desirable to provide the photographer with more options regarding the means by which he or she captures images.

A number of US patents uncovered in searching the USPTO patent database (1976 to present) discuss zoom priority. These include U.S. Pat. Nos. 5,113,210, 5,227,824, 5,231,437, 5,404,191 and 5,473,403. These patents do not appear to disclose or suggest anything regarding automated zoom control in the manner of the present invention.

SUMMARY OF THE INVENTION

The present invention provides for automated zoom control and/or automated wide angle capture control that are preferably implemented in digital camera systems. The essence of the present invention may best be described as burst mode with automated zoom/wide angle capture. Both digital cameras and control methods are disclosed.

In an exemplary automated zoom control embodiment, the camera is configured to have imaging apparatus that selectively couples images from an image scene to an image sensing apparatus that senses the coupled images. A processor implements an automated zoom control function that automatically records a plurality of closely related images having different zoom levels sensed by the image apparatus, and from which a user selects images for storage.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1:
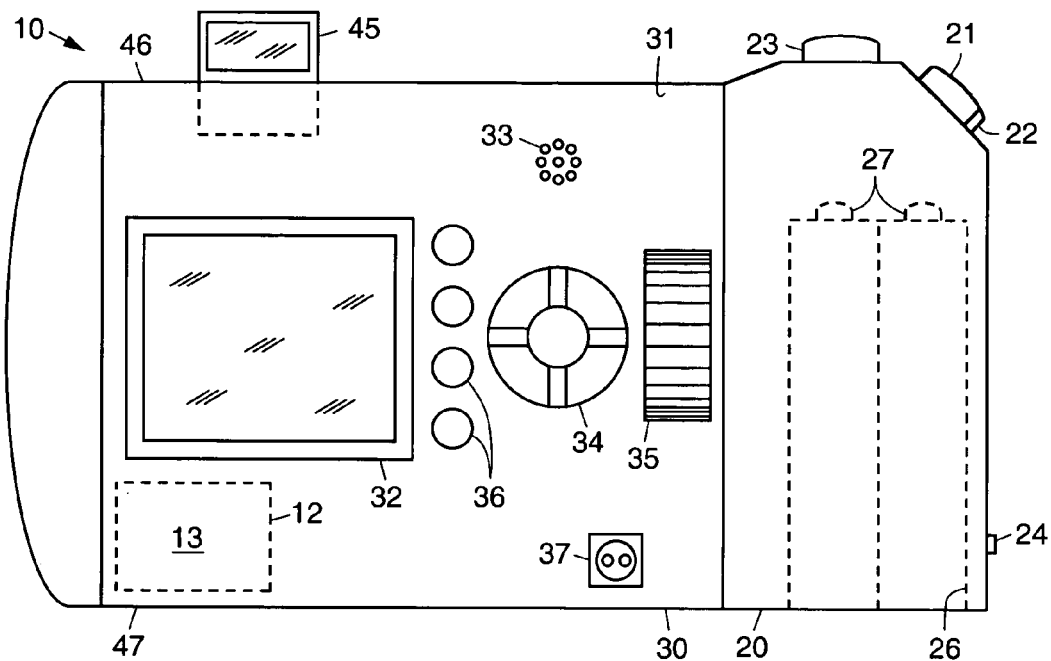
FIG. 1 is a rear view of an exemplary embodiment of a digital video camera having automated zoom control in accordance with the principles of the present invention.
Figure 2:
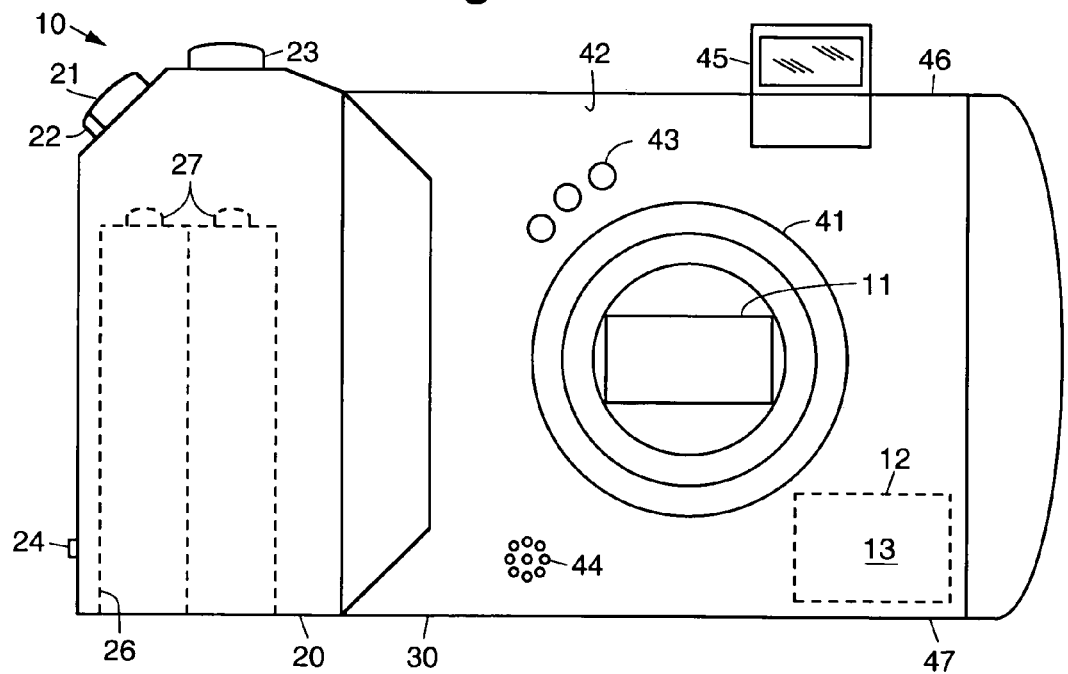
FIG. 2 is a front view of the exemplary digital camera.
Figure 3:
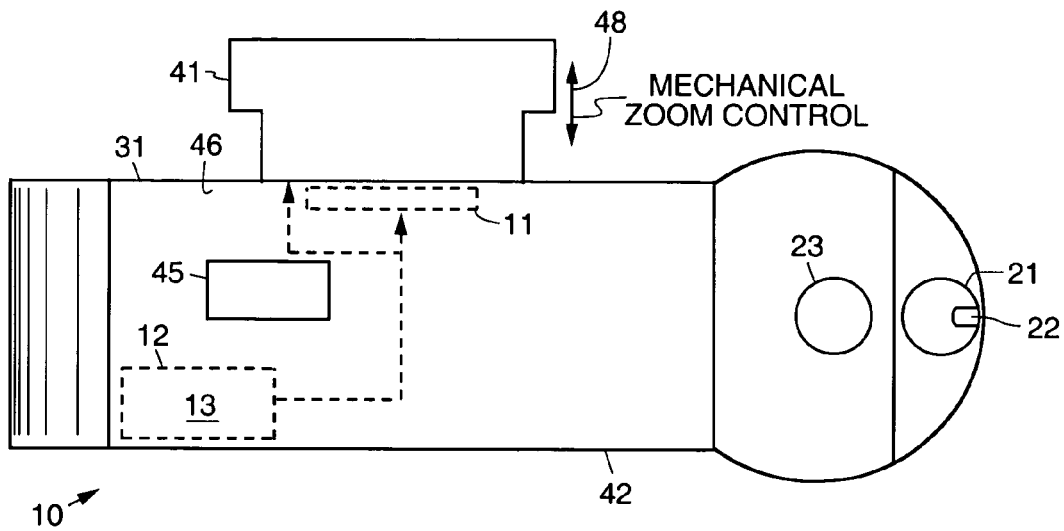
FIG. 3 is a top view of the exemplary digital camera.
Figure 4:
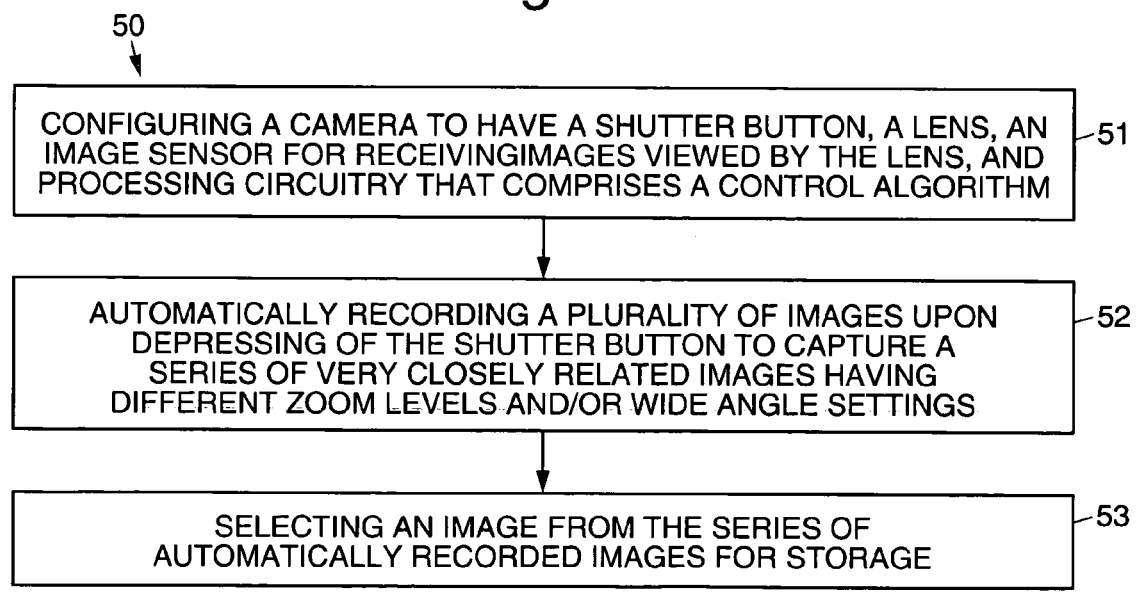
FIG. 4 is a flow diagram illustrating exemplary automated zoom control in accordance with the principles of the present invention.

Referring to the drawing figures, FIGS. 1, 2 and 3 show rear, front and top views, respectively, of an exemplary embodiment of a digital video camera 10 or digital still camera 10 having automated zoom control 50 in accordance with the principles of the present invention.

As is shown in FIGS. 1 and 2, the exemplary digital camera 10 comprises a handgrip section 20 and a body section 30. The handgrip section 20 includes a power button 21 having a lock latch 22, a shutter button 23, a strap connection 24, and a battery compartment 26 for housing batteries 27.

As is shown in FIG. 1, a rear surface 31 of the body section 30 comprises a liquid crystal display (LCD) 32 or viewfinder 32, a rear microphone 33, a joystick pad 34, a zoom control dial 35, a plurality of buttons 36 for setting functions of the camera 10 and an output port 37 for downloading images to a computer, for example.

As is shown in FIG. 2, a lens, 41, which may be a zoom lens 41, extends from a front surface 42 of the digital camera 10. A metering element 43 and front microphone 44 are disposed on the front surface 42 of the digital camera 10.

An image sensor 11 is coupled to processing circuitry 12 are housed within the body section 30. The processing circuitry 12 comprises a zoom control algorithm 13 that is used to implement the automated zoom control function of the digital camera 10. This will be discussed in more detail below.

The zoom function may be implemented using a mechanical zoom control 48 (generally designated) that moves certain optical elements of the zoom lens 41 to different physical positions. Alternatively, the zoom function may be implemented using digital zoom control (which may be performed using the processing circuitry 12 and zoom control algorithm 13) wherein pixels of a recorded image are "thrown out" or removed from the recorded image, and the image is scaled to its original size to create the illusion of zoom capture.

FIG. 3 is a flow diagram illustrating automated zoom control 50 in accordance with the principles of the present invention. The automated zoom control 50 implemented in accordance with the present invention can be described as burst mode with automated zoom capture. In the present method 50, a camera 10 is configured 50 as outlined above.

As the camera 10 zooms, several (a plurality of) images having different zoom levels are automatically recorded 52 upon assertion or depressing of the shutter button by a photographer, which amounts to burst mode image capture. The photographer thus captures a series of very closely related images having different zoom levels. The zoom levels may be either predetermined, or in the case of digital zoom, may be determined at a later time (postdetermined). The photographer then selects 53 from the recorded images those image that he or she wishes to keep, and which are stored, archived or printed.

In the case of predetermination, the use of different zoom increments may control the position of the zoom lens 41 in any number of ways. The automated zoom capture feature involves "near priority" and "far priority" images, that creates an emphasis within the set of images that are captured closer or farther away, respectively. "Custom zoom priority" is a mode in which automated zoom capture settings are programmed by the photographer and later used during-image-capture.

In terms of the user interface, the photographer would put the camera 10 in a programming mode by which the camera autodetects stops at different zoom positions (say for 1 second, for example). These zoom positions are then stored for later use when "custom zoom priority" is turned on. In the case of postdetermined zoom capture, pixels are "thrown out" or removed and the image is scaled to original size to create the illusion of zoom capture. It should be noted that zoom is used as a reference to the position of the zoom lens 41 or its optics.

The principles of the present invention can be equally applied to automated wide angle capture and a combination of zoom through wide angle capture. In these implementations, different wide angle settings are prestored, or both wide angle and zoom settings are prestored, for later use in a "custom wide angle/zoom priority" mode. When "custom wide angle priority" is turned on, several images are automatically recorded 52 at different wide angle and/or wide angle and zoom settings, and similarly when "custom wide angle/zoom priority" is turned on.

Similar to shutter-priority and aperture priority, the present invention automates the foundation processes of image capture. Using the present invention, the photographer no longer needs to worry about image capture at all, but instead can be focused on the image of interest that is to be photographed. The present automated zoom feature, and the wide angle and wide angle/zoom features, provide the photographer with more options regarding the means by which he or she captures images.

Control of the camera is more automated using the present invention. The photographer can concentrate on the image and at a later time consider framing of the image. This also gives the photographer more variation for consideration of the perfect shot long after the pictures have been taken. Further, the present invention cuts down on postview editing (in the case of predetermined/optical auto zoom) because there will be more than one zoom shot of similar scenes, cropping is reduced. Also, because the photographer can set up beforehand, all zoom positions (or wide angle) can be carefully considered and automated so that when "the perfect sunset arrives" the photographer can simply watch. Alternatively, the photographer can concentrate on framing and hold the camera in a more stable manner than when required to use the zoom control at the same time.

Thus, an improved automated zoom control system for use in digital camera systems, and the like has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A camera comprising:
   a shutter button;
   a lens;
   an image sensor for receiving images viewed by the lens; and
   processing circuitry that comprises a control algorithm that implements an automated zoom control function with a zoom burst recording mode that automatically records a plurality of images having different zoom levels upon selecting at least one automatic zoom mode and then depressing of the shutter button, and wherein the user selectively chooses one or more of the images with the different zoom levels for storage;
   wherein the automatic zoom modes include near priority mode for automatically recording the images with higher zoom levels, far priority mode for automatically recording the images with low zoom levels, custom wide angle priority for automatically recording the images at different wide angle zoom settings and custom zoom priority mode that has preprogrammed automated zoom capture settings.

2. The camera recited in claim 1 wherein the zoom levels are predetermined.

3. The camera recited in claim 1 wherein the zoom levels are postdetermined.

4. The camera recited in claim 1 which comprises mechanical zoom control that moves certain optical elements of the lens to different physical positions.

5. The camera recited in claim 1 which comprises digital zoom control wherein pixels of a recorded image are removed from the recorded image and the resultant image is scaled to its original size to create the illusion of zoom capture.

6. The camera recited in claim 1 wherein the control algorithm implements automated wide angle capture wherein different wide angle settings are prestored, and upon depressing of the shutter button, a plurality of images are automatically recorded at different wide angle and zoom settings.

7. A camera comprising:
   shutter button;
   a lens;
   an image sensor for receiving images viewed by the lens; and
   processing circuitry that comprises a control algorithm that implements an automated wide angle capture function with a zoom burst recording mode that automatically records a plurality of wide angle images having different wide angle views upon selecting the automatic wide angle capture function and then depressing of the shutter button, and from which a user selectively chooses images for storage;
   wherein the processing circuitry further includes near priority mode for automatically recording the images with higher zoom levels, far priority mode for automatically recording the images with low zoom levels and custom zoom priority mode that has preprogrammed automated zoom capture settings.

8. A method comprising the steps of:
   configuring a camera to have a shutter button, a lens, an image sensor for receiving images viewed by the lens, and processing circuitry that comprises a control algorithm, with a zoom burst recording mode, wherein the zoom burst recording mode includes near priority zoom mode for automatically recording the images with higher zoom levels, far priority zoom mode for automatically recording the images with low zoom levels, custom wide angle zoom priority for automatically recording the images at different wide angle zoom settings and custom zoom priority mode that has preprogrammed automated zoom capture settings;
   automatically recording a plurality of images upon selecting an automatic zoom mode and then depressing of the shutter button to capture a series of images having different zoom levels; and
   selecting an image from the series of automatically recorded images for storage.

9. The method recited in claim 8 wherein the zoom levels are predetermined.

10. The method recited in claim 8 wherein the zoom levels are postdetermined.

11. The method recited in claim 8 wherein the step of automatically recording the images comprises moving certain optical elements of the lens to different physical positions.

12. The method recited in claim 8 wherein the step of automatically recording the images comprises removing pixels of a recorded image from the recorded image and scaling the resultant image to its original size to create the illusion of zoom capture.

13. The method recited in claim 8 wherein the step of automatically recording the images comprises automatically recording a plurality of images to capture a series of very closely related images having different zoom levels.

14. A camera comprising:
   imaging means for selectively coupling images from an image scene;
   image sensing means for sensing the images coupled by the imaging means; and
   processing means that implements an automated zoom control function with a zoom burst recording mode, for automatically recording a plurality of images having different zoom levels sensed by the image sensing means after a user selects at least one automatic zoom mode, and from which a user selectively chooses one or more images for storage;
   wherein the automatic zoom modes include near priority mode for automatically recording the images with higher zoom levels, far priority mode for automatically recording the images with low zoom levels, custom wide angle priority for automatically recording the images at different wide angle zoom settings and custom zoom priority mode that has preprogrammed automated zoom capture settings.

15. The camera recited in claim 14 wherein the imaging means comprises a shutter button and a lens.

16. The camera recited in claim 14 wherein the zoom levels are predetermined.

17. The camera recited in claim 14 wherein the zoom levels are postdetermined.

18. The camera recited in claim 15 which comprises mechanical zoom control that moves certain of the imaging means to different physical positions.

19. The camera recited in claim 14 which comprises digital zoom control wherein pixels of a recorded image are removed from the recorded image and the resultant image is scaled to its original size to create the illusion of zoom capture.

20. The camera recited in claim 14 wherein the processing means comprises a control algorithm that implements automated wide angle capture wherein different wide angle settings are prestored, and a plurality of images are automatically recorded at different wide angle and zoom settings.

* * * * *